June 14, 1932.  W. A. J. KROHN  1,863,202

POWER UNIT

Filed April 25, 1931

Inventor
Walter A. J. Krohn
By
Attorneys

Patented June 14, 1932

1,863,202

UNITED STATES PATENT OFFICE

WALTER A. J. KROHN, OF MILWAUKEE, WISCONSIN

POWER UNIT

Application filed April 25, 1931. Serial No. 532,793.

This invention relates to improvements in power units.

One of the objects of the present invention is the provision of a power unit of the electrical type which includes a hollow shaft upon which the armature is mounted, and which is driven directly with the armature and has arranged therein, a driving shaft adapted to be operatively connected with the hollow shaft of the motor in such a manner as to provide for a variable speed drive of the inner shaft, with the entire unit arranged in a single mounting so as to provide a simple, inexpensive and compact power unit.

Another object of the present invention is the provision of a hollow shaft for electric motors, whereby a second or driving shaft may be positioned within the hollow shaft in order to provide a compact power unit, together with a driving shaft paralleling the first two shafts, and means for operatively connecting the hollow shaft with the parallel shaft and the driving shaft to provide a variable speed connection between the hollow shaft and the driving shaft.

A further object of the present invention is the provision of a power unit of the above character which includes a driving shaft arranged within a hollow motor shaft and driven directly therefrom, with means whereby to attach various types of tools to the driving shaft, so that the entire device forms a comparatively small and powerful operating unit for lathes and other tools.

With the above and other objects in view, the invention consists in the novel features of construction, the combination and arrangement of parts hereinafter more fully set forth, pointed out in the claims and shown in the accompanying drawing wherein:

Figure 1:
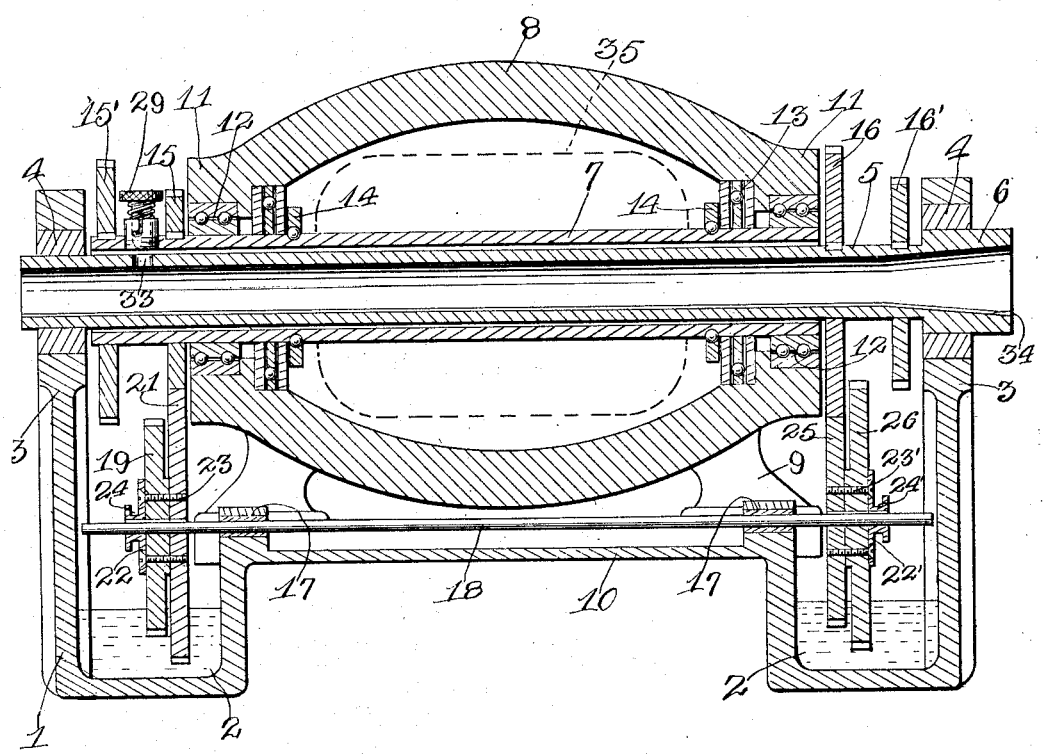
Figure 1 is a longitudinal sectional view of a power unit constructed in accordance with my invention.
Figure 2:
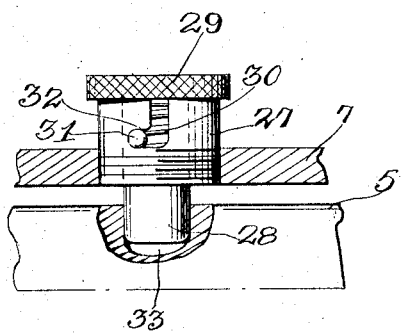
Figure 2 is a detail sectional view showing the manner of forming a direct connection between the shafts.

Referring to the drawing, it will be noted that I provide a supporting frame for the power unit indicated at 1, and this frame is provided with hollow supporting standards 2 for the reception of lubricants. The frame also includes the spaced standards 3 having bearings 4 for an interior shaft 5. One end of this shaft is provided with a tapering socket 6, rotatably mounted within the upper end of one of the bearings 4, whereby drills, lathes and other tools may be connected directly to this interior shaft.

Rotatably mounted upon the shaft 5 is a hollow motor shaft 7, supporting a frame or housing 8 which carries a plurality of supporting feet 9 adapted to be mounted upon the central portion 10 of the frame 1.

The frame or housing 8 is preferably of a sectional type to permit the several parts which are to be arranged therein to be quickly and readily placed in position. The housing or frame 8 is provided with reduced end portions 11 and arranged therein, are the ball bearings 12 carried by the hollow motor shaft 7. Suitable thrust bearings 13 are also arranged between the housing 8 and the hollow shaft 7, with collars 14 carried by the shaft 7 for retaining the thrust bearings in their proper positions.

The hollow shaft 7 extends beyond the end of the housing 8 at one end thereof and carries gears 15 and 15' which are keyed to the hollow shaft, as shown in Figure 1. The lathe shaft 5 at the opposite end of the housing 8 from the gears 15 and 15' has keyed thereto the gears 16 and 16'.

Supported within suitable bearings 17 carried by the frame 1, is a driven shaft 18 which lies parallel with the hollow shaft 7 and the lathe shaft 5. Keyed to one end of the shaft 18 for sliding movement thereon, are the gears 19 and 21. In the present instance, the gear 21 is shown in engagement with the gear 15 on the hollow shaft, while the gear 19 is out of engagement with the gear 15.

In order to shift the gears 19 and 21 longitudinally, on the shaft 18, a plate 22 is bolted to the two gears 19 and 21 by means of the bolts 23 which connect these two gears and the plate carries a collar 24 adapted to be engaged by a shaft lever for shifting the gears 19 and 21 on the shaft 18.

At the other end of the shaft 18, a pair of gears 25 and 26 are keyed for rotative and sliding movement on the shaft. These gears 25 and 26 are connected together by means of the bolts 23' which attach the plate 22' to the gears and carries a collar 24' adapted to be engaged by a shift lever for sliding the gears 25 and 26 on the shaft 18.

In the present instance, the gear 25 is operatively engaged with gear 16 on the lathe shaft 5, while the gear 26 is out of engagement with the gear 16'. Should it be desired to disconnect the gears 16 and 25 and connect up gears 16' and 26, the two gears 25 and 26 are shifted longitudinally on the shaft 18. Attention is also directed to the fact that the space between the gears 15 and 15' and between the gears 16 and 16' is sufficient to permit the gears 19 and 21 and the gears 25 and 26 to be moved into neutral position.

From the above arrangement, it will be apparent that the variable speed may be transferred to shaft 18 and thence to the lathe shaft 5. However, this speed may be varied according to the size of the gears connected to the three shafts, and by the shifting of gears 19 and 21 and the gears 25 and 26, the speed of shaft 5 may be readily varied.

In order to provide a direct drive between the hollow shaft 7 and the lathe shaft 5, a cup 27 is carried by the hollow shaft 7 and is provided with an opening in the bottom thereof through which the plunger 28 is movable. Arranged within the cup 27 and positioned between the top 29 and the bottom of the cup, is a coil spring 30 which surrounds the plunger 28 and normally urges the same upwardly within the cup.

In Figure 1, the plunger is shown in its uppermost position. However, by pressing the same downwardly against the tension of the spring 30, and causing the locking pin 31 to be engaged in the horizontal portion of the bayonet slot 32, the plunger 28 may be projected into the opening 33 in shaft 5. It will be apparent from the foregoing that a direct drive between shafts 7 and 5 may be opened by projecting the plunger 28 into the opening 33 of shaft 5. This connection is preferable where it is desired to attach tools to the lathe shaft 5 and form a direct drive.

It will be noted that one end of the shaft 5 is provided with a tapering bore 34, whereby drills, cutting tools, or the like, may be inserted into the end of the lathe shaft for driving the same directly from the motor.

It will also be noted that a great many different types of connections can be provided between the hollow motor shaft and the interior shaft 5, so that the said shaft 5 may be driven at the same speed as the hollow motor shaft, or at a different speed according to the requirements.

It will be noted that in order to provide a free and easy running between the connections of the shafts 7 and 5, through the medium of the gears, the oil pockets 2 contain a sufficient amount of oil to keep the two sets of gears 19 and 21 and 25 and 26 well lubricated, and the two pockets form suitable rests for the entire unit.

In Figure 1 in dotted lines and indicated at 35, the relative position of the armature of the shaft 7 and, as stated heretofore, the housing 8 may be of the sectional type, so that the parts contained therein can be readily removed or replaced.

The essential feature of this device is the fact that it provides a simple and inexpensive power unit preferably for driving lathe shafts and the like, although there are a great many purposes for which the device can be used.

While I have shown and described the preferred embodiment of my invention, it will be apparent from the foregoing that slight changes may be made in the construction when putting the invention into practice without departing from the spirit of the same or the scope of the appended claims.

I claim:

1. A motor transmission mechanism comprising a motor having a hollow armature shaft, a casing for the motor rotatably supporting the hollow armature shaft, a supporting frame, a longitudinally extending operating shaft extending through the hollow armature shaft, bearings carried by the supporting frame rotatably supporting the operating shaft, spaced gears of different sizes keyed to one end of the hollow armature shaft, spaced gears of different diameters keyed to the opposite end of the operating shaft, a longitudinally extending driven shaft rotatably supported by the frame arranged in parallel relation to the first shafts, and pairs of gears of different diameters feathered on the opposite ends of the driven shaft for selective engagement with either one of the spaced gears on the armature and operating shafts.

2. A motor transmission mechanism comprising a motor having a hollow armature shaft, a casing for the motor rotatably supporting the hollow armature shaft, a supporting frame, a longitudinally extending operating shaft extending through the hollow armature shaft, bearings carried by the supporting frame rotatably supporting the operating shaft, spaced gears of different sizes keyed to one end of the hollow armature shaft, spaced gears of different diameters keyed to the opposite end of the operating shaft, a longitudinally extending driven shaft rotatably supported by the frame arranged in parallel relation to the first shafts, and pairs of gears of different diameters feathered on the opposite ends of the driven shaft for selective engagement with either one of the spaced gears on the armature shaft and the operating shaft, or out of engagement with all of the first mentioned gears, and means for detachably locking the armature shaft and operating shaft together for synchronous movement.

In testimony that I claim the foregoing I have hereunto set my hand at Milwaukee, in the county of Milwaukee and State of Wisconsin.

WALTER A. J. KROHN.